2,780,585
Patented Feb. 5, 1957

2,780,585

SEPARATION OF CONTACT SOLIDS ACCORDING TO DEGREE OF CONTAMINATION

Ernest Musslewhite, Jr., Roselle, N. J., and Joseph C. Roediger, Staten Island, N. Y., assignors to Esso Research and Engineering Company, a corporation of Delaware No Drawing. Application October 19, 1951,
Serial No. 252,212

8 Claims. (Cl. 196—52)

This invention relates to a method for separating mixtures of small particles of silicious cracking catalyst or the like into fractions of relatively higher and lower degree of iron content. More specifically, the invention relates to a method of separating particle fractions having a high concentration of iron from catalysts composed predominantly of silica, or mixtures of silica and alumina or magnesia, or treated natural clay.

It is well known that the activity as well as selectivity of various catalysts is adversely affected by the presence of metallic contaminants such as iron. Such contamination may come from certain ash constituents of the feed stock, but tends to be especially severe in so-called fluidized operations wherein powdered catalyst is circulated at high rates between a conversion zone and a regeneration zone, with attendant erosion of steel reactors and conduits. As a result iron becomes incorporated in the circulating catalyst. Particularly in the field of catalytic cracking of hydrocarbons such contamination with iron or iron oxide results in a lower yield of the desired cracked products and in increased formation of gas and carbon.

To minimize this harmful effect of iron contaminants it has been proposed heretofore selectively to remove catalyst particles of high iron content from the system. Such previous separation methods were based largely on the fact that catalyst particles highly contaminated with iron have a somewhat greater density than less contaminated particles, and consequently it has been possible to obtain some selective separation of iron contaminants either by air elutriation or by centrifugal force. However, such methods were subject to the serious drawback that fractionation was effected not only on the basis of density, but also on the basis of particle size, so that relatively coarse but substantially uncontaminated particles were rejected along with the relatively small, dense, contaminated particles. Other separation methods have relied on the selective removal of iron-contaminated catalyst particles by magnetic means, by screening or by settling using various liquid separating media, but all of these methods were also subject to various difficulties and have attained only very limited commercial use.

It is the principal object of this invention to provide an improved method for separating a mixture of finely divided particles into fractions on the basis of iron or iron oxide contamination of the particles. It is a further object of this invention to provide an economical method for separating iron-contaminated particles from used, regenerated silica-based catalysts, such as silica-alumina cracking catalysts, by froth flotation. Still other objects and details of the invention, as well as its scope, will become more clearly apparent from the subsequent description and claims.

Flotation has been employed before in other arts to effect selective separation of grains of various kinds of minerals or chemical compounds. For instance, in the purification of crude ores, particles of concentrated ore can be separated from the gangue by flotation. In general such flotation techniques have been applied to minerals containing substantial proportions of each of at least two constituents and which, on grinding, give a mixture of individual particles each of which has a predominants concentration of one or the other constituent. However, it has now been discovered that in the case of small-sized silica-containing catalysts, flotation can be used with surprising effectiveness to separate therefrom particles relatively highly contaminated with metal or metal oxide impurities, although such impurities may be present in relatively low concentrations with reference both to the total catalyst mixture and to the individual catalyst particles. In particular, it has been discovered that since uncontaminated silica is very difficult to float and since the metallic contaminants are eventually concentrated largely on the surface of the individual catalyst particles, and the latter are of a size directly usable in flotation processes without grinding, flotation can be used with unusual advantage to effect selective separation of contaminated from less contaminated catalyst particles at surprisingly low contaminant concentrations.

Essentially, the desired separation of iron contaminants from a used synthetic silica-alumina gel cracking catalyst or the like is accomplished in accordance with the present invention by means of an especially devised flotation process wherein acidic or anionic reagents are used as flotation agents or collectors. A frother such as pine oil or an auxiliary flotation agent such as mineral oil are also preferably present in conjunction with the collector. Flotation temperatures between about 40 and 100° F. and higher may be used.

By "flotation" is meant a process wherein grains of relatively highly contaminated inorganic particles contained in a dilute aqueous slurry are selectively caused to rise to the surface of the liquid in a cell or tank, usually by action of air which is bubbled upward through the slurry. The risen grains are caught and removed in a froth formed on the surface of the flotation cell while the relatively uncontaminated grains remain in the slurry and are withdrawn from the bottom of the cell. The fraction risen to the surface is usually referred to as the "concentrate" and the unfloatable fraction is referred to as "tailings" or "tails." Where desired, the concentrate from a "rougher" or first cell may be fed to subsequent tanks known as "cleaner cells" and "recleaner cells" for further fractionation and the tailings also may be recirculated or concentrated separately in additional cells. Soft water is preferably used as the main flotation medium. Moreover, particularly when carrying out the flotation in the presence of an oily flotation and, it is desirable to get the catalyst mixture containing contaminated and uncontaminated particles wet with water first, so as to avoid contact of the relatively uncontaminated particles with the oil layer or froth at the top of the flotation cell. Otherwise, once the dry uncontaminated particles get wetted with oil first, they tend to float along with the contaminated particles in the concentrate layer instead of settling out into the tailings. Accordingly, it has been found especially advantageous to add the catalyst to the flotation cell by injecting it as a water slurry substantially below the frothed surface. Alternatively, especially in the case of batch operations, one may add the dry catalyst mixture to the water in the flotation cell before adding any collector, and especially before adding any oily flotation aid to the aqueous medium.

Flotation agents or collectors used to cause selective filming of the iron-contaminated catalyst particles are of the acidic or anionic type and include saturated or unsaturated fatty acids having 8 to 24 carbon atoms per molecule such as caprylic, stearic, palmitic or lauric, or preferably oleic acid. Other carboxylic acids such as naphthenic acids have also been found highly useful. Still other anionic flotation agents such as potassium ethyl xanthate and other xanthates, dithiophosphates, fatty alcohol sulfates such as sodium lauryl sulfate and various metal dialkyl dithiocarbamates such as zinc dimethyl dithiocarbamate and tellurium diethyl dithiocarbamate can also be used but are less effective. The preferred carboxylic acids have been found particularly effective in the pH range between 2 and 6.5, mineral acid such as sulfuric or hydrochloric acid being useful for adjusting the hydrogen ion concentration to the desired value.

Instead of adding the preferred carboxylic acids in substantially pure form, equally good or better results can be obtained by use of certain mineral oils with the collector. The anionic collector may be added to the flotation cell in concentrations of about 0.0001 to 1, or preferably about 0.001 to 0.1 weight percent of the active agent based on the aqueous flotation medium present, the optimum being somewhat proportional to the total amount of contaminated catalyst present.

In general also somewhat greater amounts of the collector may be required when hard rather than soft water is used as the flotation medium. The optimum concentration of collector can be readily determined for each individual case so as to obtain maximum separation. Optimum separation according to iron content may be obtained when operating with just enough of the collector present to float up the heavily contaminated catalyst particles, but not enough to float up only slightly contaminated particles, and where necessary, further fractionation of the resulting tailings may be carried out in subsequent flotation cells with lower or higher collector concentrations than that used in the previous cell. In general it is preferable to operate below rather than above the optimum collector concentration, since above this point catalyst particles containing even a relatively small amount of iron or iron oxide tend to be floated up along with the most heavily contaminated fractions and the degree of selectivity of the separation may thus be greatly impaired.

In conjunction with the aforementioned collectors, the addition of auxiliary frothers such as pine oil and cresylic acid, soft and hardwood oils, as well as certain relatively water insoluble, branched-chain alcohols or mixtures of such alcohols with ketones is also desirable in concentrations of about 5 to 100 percent of the collector concentration, since this further increases the efficiency of the separation.

However, in lieu of or in addition to such auxiliary frothers, it is also possible to use various mineral oil fractions such as light gas oils, highly refined neutral white oils (Nujol) or lube distillates. When used in sufficient quantity to form a continuous layer at the top of the flotation cell, these oils also improve the separation of contaminated from uncontaminated catalyst to a surprising extent, apparently due to the fact that the hydrocarbon end of the collector which surrounds the contaminated catalyst particles has a strong affinity for the oil and consequently may cause both an increased rate of ascent and an increased retention of the contaminated particles in the oil layer at the top of the cell whence the contaminated concentrate is removed.

By selection of a mineral oil with a suitable content of natural naphthenic-type acids, one can improve efficiency of separation, or actually eliminate the need for extraneous collectors. Thus, Venezuelan gas oil which may have a neutralization number (which is a measure of the oil acidity determined as the milligrams of potassium hydroxide reacting per gram of oil) of about 1 to 3 is an example of the latter type of acid-containing mineral oil.

The catalysts to which this invention is applicable are predominantly silicious materials and particularly the so-called synthetic silica gels and mixed catalysts such as those containing silica together with about 5 to 35 weight percent of alumina or magnesia, with or without minor amounts of still other oxides such as boria, molydbena and the like. Cracking catalysts made by special acid treatment and washing of natural clays such as bentonite or montmorillonite also lend themselves to similar treatment.

These catalysts are used in the form of a powder of a particle size between about 0 to 300 or preferably 10 to 150 microns as is common in fluidized catalytic operations, though the invention is similarly applicable to the decontamination of silicious catalyst particles which may range in diameter up to about 1000 microns. Particularly effective catalyst separation is obtained if the catalyst mixture to be purified shows some discontinuity in the iron concentration of its constituent fractions. Consequently, when it is desired to purify the conversion catalyst by the flotation process presently described, it may be preferable to add fresh make-up catalyst to the conversion system intermittently rather than continuously, so as to allow the oldest catalyst of the system to build up an appreciably higher iron content than the catalyst added in subsequent make-up portions.

In general it is important that the catalyst treated in accordance with the present invention be first regenerated with air and freed from fresh carbonaceous deposit, as fresh carbon will interfere with the selectivity of the flotation process. Especially where a supernatant oil layer is used on top of the aqueous flotation medium as mentioned above, fresh carbon tends to cause substantially all of the catalyst to float up into the oil-water interface. However, it is to be understood that the treated catalyst need not be entirely free of all carbon and that the invention can be applied to regenerated catalysts from commercial units containing on the average as much as 1.0 weight percent of carbon, although the selectivity of the process is normally improved by further regeneration of the catalyst, if required, to reduce the average carbon content on the catalyst to less than 0.5 weight percent. Excessive amounts of carbon deposit are of course detrimental since this may render the iron contaminants inaccessible to the flotation agent and accordingly the selective action of the latter may thus be substantially lost.

The invention is illustrated further in the following specific examples.

EXAMPLE 1

To demonstrate the operation of the invention, a blend was made by thoroughly shaking in a flask equal weights of two catalysts characterized by different degrees of iron contamination and having the following properties:

Table I

| Catalyst | No. 1 | No. 2 |
| --- | --- | --- |
| $Fe_2O_3$, weight percent | 0.06 | 1.02 |
| Surface Area, m.²/gram | 90 | 90 |
| Particle Density, gram/cm.³ | 1.53 | 1.42 |
| Catalytic Activity [1] | 25.0 | 17.0 |
| Carbon Producing Factor [2] | 0.89 | 4.56 |
| Roller Analysis (Size), Weight Percent: | | |
| 0–20 microns | 0.2 | 0.0 |
| 20–40 microns | 1.0 | 0.3 |
| 40–80 microns | 26.0 | 25.0 |
| 80+ microns | 72.8 | 74.7 |

[1] Catalytic activity was measured in terms of gasoline yield produced from a given gas oil by cracking it in a test unit under standardized conditions in contact with the catalyst being tested.
[2] Carbon producing factor is the ratio of weight percent of carbon deposited on the tested catalyst from a given gas oil during a standardized cracking test, to the weight percent of carbon deposited under identical conditions on a freshly prepared reference catalyst which was arbitrarily chosen as having a carbon producing factor equal to 1.

Catalyst No. 1 described in the above table was a deactivated "fluid" microspherical gel catalyst consisting of about 80 weight percent silica and 20 weight percent alumina and was characterized by a very low level of iron contamination, whereas catalyst No. 2 was contaminated to the indicated iron content during a previous catalytic cracking run in a fluidized pilot unit starting with a catalyst essentially identical with catalyst No. 1.

Prior to mixing, both catalysts were burned substantially free of carbon. With the exception of the contamination level, both catalysts were practically identical in particle size distribution, density and surface area. However, it can be seen that the high iron content of catalyst No. 2 had a strongly adverse effect both on the catalytic activity and on carbon formation.

In carrying out the flotation run, about 2000 cc. of distilled water to which 1 cc. of oleic acid, or about 0.045 weight percent of acid based on the water, had been added were aerated at room temperature at a superficial air velocity of about 0.1 ft./sec. in a flotation cell consisting of an upright 4 inch glass pipe about 18 inches high. About 10 grams of the above described 50/50 catalyst mixture were poured into the aerated and frothed liquid and allowed five minutes to reach equilibrium. The so-called concentrate or accumulated catalyst particles carried by the froth to the upper walls of the pipe and those contained in the froth at the top of the column of liquid were collected, washed with water, dried and heated for a 2-hour period at 1000° F. in air. After removal of the concentrate, aeration of the flotation cell was stopped and the remaining catalyst particles or "tailings" consequently settled on the sintered plate used as an air distributor at the bottom of the cell. The tailings were then collected and washed, dried and heated in the same fashion as the concentrate. Four additional such flotation runs were made in order to obtain sufficient samples for testing and the results shown in Table II were obtained.

*Table II.—Results of flotation separation*

| Catalyst | Charge (50/50 Blend) | Concentrate | Tailings |
|---|---|---|---|
| Total Weight, grams | 50 | 11 | 36 |
| Separation, Weight Percent | | 22 | 72 |
| Fe₂O₃ Content, Weight Percent | 0.49 | 0.87 | 0.37 |
| Fe₂O₃ Distribution, grams | 0.245 | 0.096 | 0.133 |
| Fe₂O₃ Distribution, Weight Percent of Original | 100 | 39.2 | 54.3 |
| Roller Analysis, Weight Percent: | | | |
| 0–40 microns | 0.4 | 0.0 | 0.2 |
| 40–60 microns | 8.6 | 8.7 | 9.5 |
| 60–80 microns | 16.1 | 17.1 | 18.5 |
| 80–100 microns | 30.2 | 31.8 | 32.5 |
| 10+ microns | 44.7 | 42.4 | 39.3 |

The above results show that the iron content of the catalyst can be substantially reduced and that this separation is not based on particle size or weight characteristics. Approximately 40 percent of the total iron originally present in the blended catalyst mixture was removed in the concentrate with a loss of only 28% of the catalyst in a single-step separation. Even more selective results can be obtained by subjecting the separated concentrate and tailings to further flotation treatments.

EXAMPLE 2

Another series of tests was carried out in order to compare: (1) the effect of oleic acid alone as a flotation agent, (2) the effect of pine oil as a frothing agent in addition to oleic acid, (3) the use of a neutral mineral oil as a flotation aid in addition to the oleic acid, and (4) the use of a mineral oil containing naturally occuring naphthenic acids as the sole flotation agent. The oil used in the particular test was a Venezuelan gas oil (Bachaquero 350/750° FVT) having a Neutralization Number of 1.3.

These tests were made in stoppered 250 cc. graduates to which soft water and the reagents in the amounts shown in Table III below were added; the mixture was shaken for 30 seconds; and then a small quantity of the 50/50 catalyst blend described in Example 1 and containing 0.49 weight percent of Fe₂O₃ was added to the graduate. The contents of the graduates were again shaken for 30 seconds and then allowed to set for 5 minutes after which the catalyst which had floated to the top and remained there was siphoned off into one beaker and that which had settled to the bottom was withdrawn into another beaker. The unfloated catalyst fraction was then filtered out, dried, and analyzed for iron content. The data from these experiments are summarized in the table below:

*Table III*

| Test No | 1 | 2 | 3 | 4 |
|---|---|---|---|---|
| Conditions: | | | | |
| Soft Water, cc | 150 | 150 | 150 | 150 |
| 50/50 Catalyst Blend, grams | 2.0 | 2.0 | 2.0 | 7.0 |
| Oleic Acid, cc | 0.08 | 0.08 | 0.08 | 0.0 |
| Pine Oil, cc | 0.0 | 0.08 | 0.0 | 0.0 |
| Neutral Oil, cc | 0.0 | 0.0 | 5.0 | 0.0 |
| Venezuelan Gas Oil, cc | 0.0 | 0.0 | 0.0 | 1.0 |

CHARGE CATALYST (0.49 WT. PERCENT Fe₂O₃)

| | | | | |
|---|---|---|---|---|
| Wt. Percent of Catalyst Unfloated | 82 | 74 | 33 | 56 |
| Wt. Percent Fe₂O₃ on Unfloated Catalyst | 0.42 | 0.37 | 0.29 | 0.23 |

From a comparison of the results of these tests it will be noticed that— a. Oleic acid by itself (illustrated in Test 1) results in some selective separation of iron contaminated catalyst.

b. The addition of pine oil as a frothing agent to the oleic acid (Test 2) improves the selectivity.

c. The use of a neutral oil with oleic acid (Test 3) further improves selectivity, but with a considerable sacrifice in yield under the particular conditions chosen. Better results may be obtained at optimum conditions.

d. The use of an oil containing naturally occurring naphthenic acids as the sole flotation agent (Test 4) gives the best selectivity and with a much better yield than the case of neutral oil and oleic acid.

Furthermore, when Test 4 was repeated, except that the catalyst was charged in the form of a slurry introduced by means of a tube extending below the oily surface of the flotation medium, a still better yield of unfloated, low-iron catalyst was obtained. This indicates that contact of the dry catalyst charge with the oily flotation aid has a harmful effect on selectivity as mentioned earlier herein, and should be avoided by first wetting the catalyst charge with water. At the same time such initial wetting of the entire catalyst charge with water does not prevent the contaminated catalyst particles in the mixture from being properly wetted with the collector, and being selectively floated up to the surface subsequently in the course of the flotation.

Having described the nature and operation of the invention, including several specific examples thereof, it will be understood that this was done mostly for purposes of illustration rather than limitation. Various modifications may be made by persons skilled in the art without departing from the present invention for which patent protection is sought and whose scope and spirit is particularly pointed out in the appended claims.

We claim:

1. In a process wherein a synthetic silica-alumina gel catalyst powder is circulated back and forth between a fluidized gas oil cracking zone and a fluidized catalyst regeneration zone and becomes contaminated with iron, the improvement which comprises the steps of withdrawing from the regeneration zone a stream of iron contaminated catalyst, cooling said catalyst, introducing the withdrawn catalyst into a flotation cell containing water and about 0.001 to 0.1 weight percent based on the water of a collector selected from the group consisting of fatty acids and naphthenic acids containing 8 to 20 carbon atoms per molecule, said flotation cell being maintained at a pH between about 2.0 and 6.5 passing air upwardly through the flotation cell to aerate and froth the acid-containing water and to float a concentrate of relatively highly contaminated catalyst particles to the surface while tailings containing relatively less contaminated particles settle out at the bottom, removing the relatively highly contaminated concentrate from a top portion of the flotation cell, and removing the less contaminated tailings from a bottom portion of the flotation cell.

2. A process according to claim 1 wherein the collector is oleic acid.

3. A process according to claim 1 wherein the collector is oleic acid and 5 to 100 weight percent of a wood oil based on the collector concentration is used as a frother in conjunction with the collector.

4. A process according to claim 3 wherein the wood oil is pine oil.

5. A process according to claim 1 wherein a mineral oil boiling above about 500° F. is used in conjunction with the collector, being present in 25 to 500 times the collector concentration.

6. A process according to claim 1 wherein the collector is added in the form of a gas oil fraction naturally containing naphthenic acid.

7. In a process wherein a synthetic silica-alumina gel catalyst powder is circulated back and forth between a fluidized hydrocarbon oil conversion zone and a fluidized catalyst regeneration zone and becomes contaminated with iron impurities, the improvement which comprises the steps of withdrawing from the regeneration zone a stream of dry iron-contaminated catalyst containing not more than 1.0 wt. percent of carbon, cooling said withdrawn catalyst, mixing the withdrawn cooled catalyst with water to form a slurry, introducing said catalyst slurry into a flotation cell containing water and about 0.001 to 0.1 part by weight of a flotation collector selected from the group consisting of fatty acids and naphthenic acids containing 8 to 20 carbon atoms per molecule and a small amount of oily frother to 100 parts by weight of water in said flotation cell to obtain an acid flotation medium having an oily surface, said flotation cell being maintained at a pH between about 2.0 and 6.5, passing air through said flotation cell containing the catalyst and the acid flotation medium to aerate and froth the medium and to float a concentrate of relatively highly contaminated catalyst particles to the surface while tailings containing relatively less contaminated particles settle out at the bottom, removing the concentrate from a top portion of said flotation cell, removing the less contaminated tailings from a bottom portion of said flotation cell, and returning removed tailings to said hydrocarbon oil conversion zone.

8. A process as defined in claim 7 wherein said catalyst water slurry is introduced into said flotation medium at a level below the oily surface of said flotation medium.

References Cited in the file of this patent

UNITED STATES PATENTS

| | | |
|---|---|---|
| 2,283,295 | Tartaron et al. | July 11, 1941 |
| 2,312,230 | Belchetz | Feb. 23, 1943 |
| 2,483,372 | Payne | Sept. 27, 1949 |
| 2,567,207 | Hoge | Sept. 11, 1951 |
| 2,598,309 | Say et al. | May 27, 1952 |
| 2,643,215 | Hoge | June 23, 1953 |

OTHER REFERENCES

Chemical Constituents of Petroleum, Sachanen, 1945, Reinhold Pub. Co., New York, page 316.

"Handbook of Mineral Dressing," Taggart, John Wiley and Co. Inc., New York, 1945, pages 12–06, 12–07, 12–12, 12–13, 12–18, 12–38, 12–44, 12–52, 12–55.

Gravity Separation of Inactive Catalyst, by C. K. Viland, Oil and Gas Journal, vol. 49, No. 30, pages 74, 75 and 78; November 30, 1950.